United States Patent [19]
Yoshida et al.

[11] Patent Number: 5,608,535
[45] Date of Patent: Mar. 4, 1997

[54] VIDEO SIGNAL REPRODUCTION OR RECORD/REPRODUCTION APPARATUS

[75] Inventors: Mitsuhiro Yoshida, Yokohama; Hiroshi Asai, Sagamihara, both of Japan

[73] Assignee: Victor Company of Japan, Ltd., Yokohama, Japan

[21] Appl. No.: 258,868

[22] Filed: Jun. 13, 1994

[30] Foreign Application Priority Data

Jun. 25, 1993 [JP] Japan ............................ 5-177538

[51] Int. Cl.⁶ ........................... H04N 5/76; G11B 5/00
[52] U.S. Cl. ........................... 386/123; 360/32
[58] Field of Search ........................ 358/342, 335, 358/310; 360/9.1, 27, 32; 348/555, 558

[56] References Cited

U.S. PATENT DOCUMENTS

| | | | |
|---|---|---|---|
| 4,630,131 | 12/1986 | Ichinoi et al. | 358/310 |
| 4,962,428 | 10/1990 | Tong et al. | 348/555 |
| 4,963,991 | 10/1990 | Honjo | 358/310 |
| 5,237,420 | 8/1993 | Hayashi | 348/555 |

FOREIGN PATENT DOCUMENTS 63-203075  8/1988  Japan .

*Primary Examiner*—Tommy P. Chin
*Assistant Examiner*—Robert Chevalier
*Attorney, Agent, or Firm*—Lowe, Price, LeBlanc & Becker

[57] ABSTRACT

A video signal reproduction or record/reproduction apparatus comprises a first playback circuit reproducing a normal video signal from a recording medium and outputting a reproduced normal video signal to a TV receiver, and a second playback circuit reproducing a high definition video signal from the recording medium and outputting a reproduced high definition video signal to the TV receiver. The type of a reproduced video signal is judged. When the judgement result indicates that the type of the reproduced video signal is a normal video signal, the first playback circuit is allowed to output the reproduced normal video signal to the TV receiver while the second playback circuit is enforced to mute the reproduced high definition video signal. In a disabled or transition period during which the type of the reproduced video signal cannot be judged, the first and second playback circuits select an output video signal on the basis of a judgement result judged immediately before such a disabled or transition period.

5 Claims, 4 Drawing Sheets

FIG. 2

| MODE \ OUTPUT | | NTSC OUT | HD OUT |
|---|---|---|---|
| E-E MODE | NTSC RECEPTION | 12a | MUTE |
| | HD RECEPTION | 15a | 15b |
| NTSC REC MODE | NTSC RECEPTION | 12a | MUTE |
| | HD RECEPTION | 15a | MUTE |
| HD REC MODE | NTSC RECEPTION | MUTE OR 20a | 16c |
| | HD RECEPTION | MUTE OR 20a | 15b |
| REC-SIGNAL PLAYBACK | NTSC PLAYBACK | 16a | MUTE |
| | HD PLAYBACK | MUTE OR 20a | 16b |
| NON-SIGNAL PLAYBACK | PREVIOUSLY NTSC PLAYBACK | 16a | MUTE |
| | PREVIOUSLY HD PLAYBACK | MUTE OR 20a | 16c OR 16b |

VIDEO SIGNAL REPRODUCTION OR RECORD/REPRODUCTION APPARATUS

CROSS-REFERENCE TO THE RELATION APPLICATION

The present invention is related to the invention illustrated and described in the copending application Ser. No. 08/224, 493 filed on Apr. 7, 1994 and entitled "HIGH-DEFINITION PICTURE SIGNAL RECORDING/REPRODUCING APPARATUS FOR RECORDING AND REPRODUCING A HIGH-DEFINITION PICTURE SIGNAL CONTROLLED ITS AMPLITUDE LEVEL", being invented by Ichinoi et al. and assigned to the same assignee as the present invention.

BACKGROUND OF THE INVENTION

1. Field of the Invention

The present invention relates to a video signal reproduction or record/reproduction apparatus.

2. Prior Art

FIG. 4 is a block diagram showing a conventional video signal record/reproduction apparatus with an associated television receiver.

A video signal record/reproduction apparatus (abbreviated hereinafter as "VTR"), used for recording television video signals on magnetic tape for later rebroadcasting or reproduction of television programs, normally includes a tuner to reproduce a video signal which is displayed on a television receiver (abbreviated hereinafter as "TV"). Thus, a VTR 1' is connected to a TV 2 as illustrated in FIG. 4. The VTR 1' is further connected to a first television antenna 3 for receiving terrestrial broadcast signals and a second television antenna 4 for receiving satellite broadcast signals. More specifically the VTR 1', including a first tuner (not shown) connected to the first television antenna 3 and a second tuner (not shown) connected to the second television antenna 4, supplies the TV 2 with an output normal video signal (abbreviated hereinafter as "NTSC" signal) aa which is an output from the VTR 1' as a result of optimum selection between tuning frequencies of first and second tuners by a VTR remote controller 5.

Meanwhile, recent development of television technologies has introduced a high definition broadcast service with a high definition video signal (abbreviated hereinafter as "HD" signal) having scanning lines whose number is larger than that of the NTSC signal. And, a television set compatible with both the HD signal and the NTSC signal is already on sale.

However, such a television set is not yet convenient because the television set itself needs to select manually (by the aid of an operator) a desirable input signal among a plurality of different types of video signals.

SUMMARY OF THE INVENTION

Accordingly, in view of above-described problem encountered in the prior art, a principal object of the present invention is to provide a novel and useful, video signal reproduction or record/reproduction apparatus which is capable of automatically switching the input video signal and avoiding unnecessary switching operation of the input video signal.

In order to accomplish this and other related objects, a first aspect of the present invention provides a video signal reproduction or record/reproduction apparatus comprising: first playback means for reproducing a normal video signal from a recording medium and outputting a reproduced normal video signal; second playback means for reproducing a high definition video signal from the recording medium and outputting a reproduced high definition video signal; judging means for judging the type of a reproduced video signal; output signal control means for controlling the first and second playback means in such a manner that, when judgement result of the judging means indicates that the type of the reproduced video signal is a normal video signal, the output signal control means allows the first playback means to output the reproduced normal video signal and makes the second playback means mute the reproduced high definition video signal.

Furthermore, a second aspect of the present invention provides a video signal reproduction or record/reproduction apparatus comprising: first playback means for reproducing a normal video signal from a recording medium and outputting a reproduced normal video signal; second playback means for reproducing a high definition video signal from the recording medium and outputting a reproduced high definition video signal; judging means for judging a type of a reproduced video signal; output signal control means for controlling the first and second playback means in such a manner that, when judgement result of the judging means indicates that the type of the reproduced video signal is a high definition video signal, the output signal control means makes the first playback means mute the reproduced normal video signal and allows the second playback means to output the reproduced high definition video signal.

According to the video signal reproduction or record/reproduction apparatus of the first and second aspects of the present invention, it is preferable that, in a disabled or transition period during which the judging means cannot judge the type of the reproduced video signal, the output signal control means controls the first and second playback means to select an output video signal on the basis of a judgement result of the judging means judged immediately before such a disabled or transition period.

A third aspect of the present invention provides a video signal reproduction or record/reproduction apparatus comprising: first demodulating means for demodulating a normal video signal received through a first television antenna and outputting a demodulated normal video signal; second demodulating means for demodulating a high definition video signal received through a second television antenna and outputting a demodulated high definition video signal; judging means for judging a type of a demodulated video signal; output signal control means for controlling the first and second demodulating means in such a manner that, when judgement result of the judging means indicates that the type of the demodulated video signal is a normal video signal, the output signal control means allows the first demodulating means to output the demodulated normal video signal and makes the second demodulating means mute the demodulated high definition video signal.

Moreover, a fourth aspect of the present invention provides a video signal record/reproduction apparatus comprising: first recording means for recording a normal video signal received through a first television antenna and outputting a received normal video signal; second recording means for recording a high definition video signal received through a second television antenna and outputting a received high definition video signal; judging means for judging a type of a recorded video signal; output signal control means for controlling the first and second recording means in such a manner that, when judgement result of the judging means indicates that the type of the recorded video signal is a normal video signal, the output signal control means allows the first recording means to output the received normal video signal and makes the second recording means mute the received high definition video signal.

Still further, a fifth aspect of the present invention provides a video signal record/reproduction apparatus comprising: first recording means for recording a normal video signal received through a first television antenna and outputting a received normal video signal; second recording means for recording a high definition video signal received through a second television antenna and outputting a received high definition video signal; judging means for judging a type of a recorded video signal; output signal control means for controlling the first and second recording means in such a manner that, when judgement result of the judging means indicates that the type of the recorded video signal is a high definition video signal, the output signal control means makes the first recording means mute the received normal video signal and allows the second recording means to output the received high definition video signal.

In the above second and fifth aspects of the present invention, it is preferable to replace the muting operation by a message informing an operator of a present mode.

BRIEF DESCRIPTION OF THE DRAWINGS

The above and other objects, features and advantages of the present invention will become more apparent from the following detailed description which is to be read in conjunction with the accompanying drawings, in which:

FIG. 2 is a table showing relation between output video signals and respective modes;

DETAILED DESCRIPTION OF THE PREFERRED EMBODIMENT

First of all, a fundamental technology for the invention will be explained, which is an advanced video signal record/reproduction apparatus compatible with both the NTSC signal and the HD video signal.

Figure 5:
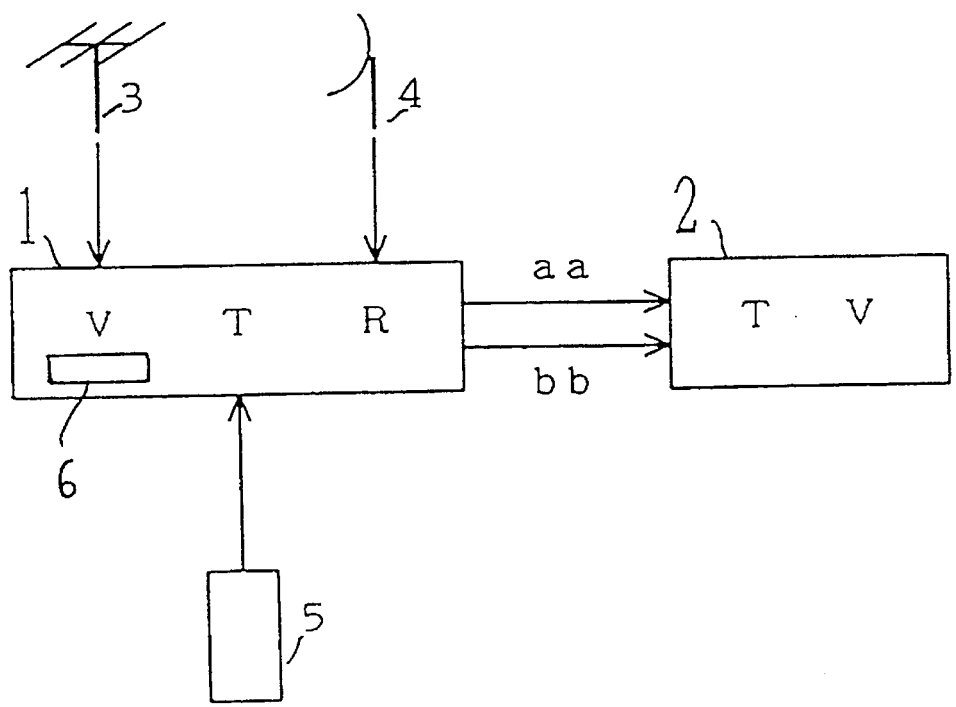
FIG. 5 is a block diagram showing an advanced video signal record/reproduction apparatus, which is compatible with both the NTSC signal and the HD signal, with an associated television receiver.

In FIG. 5, the VTR 1 is connected to the first television antenna 3 for receiving the terrestrial broadcast signal, such as NTSC signal, and is also connected to the second television antenna 4 for receiving the satellite broadcast signal, such as HD signal. The VTR 1 includes a first reproduction circuit which reproduces an NTSC signal received through the first television antenna 3 and a second reproduction circuit which reproduces an HD signal received through the second television antenna 4. The TV 2 receives the output NTSC signal aa and output HD signal bb sent from the first and second reproduction circuits of the VTR 1.

A channel of video signal to be received is selected by the VTR remote controller 5 which is manipulated by an operator. Since the high definition signal broadcast service is based on a satellite broadcast system, the HD signal is received by the VTR 1 through the second television antenna 4 and is sent to the TV 2. In such a case, it is usual that the TV 2 is already systematically engaged with the first reproduction circuit for reproduction of the output NTSC signal aa on the screen of the TV 2. Under such conditions, the HD signal is not immediately displayed on the screen of the TV 2 even if the HD signal is surely received by the second television antenna 4, unless the operator intentionally changes the input signal of the TV 2 from the first reproduction circuit to the second reproduction circuit. To eliminate this inconvenience, the TV 2 of the present invention includes an arrangement to detect the presence of the output HD signal by checking the presence of, for example, a sync signal. If it is judged that the output HD signal bb is being supplied to the TV 2, automatic switching operation is immediately effected to enforce the TV 2 to be systematically engaged with the second reproduction circuit, thus releasing the operator from troublesome selecting operations of input video signal. This automatic switching operation enables the system to avoid unnecessary switching operations of input signal and accordingly enhances reliability in view of necessity of providing a relay or the like which is operated to switch the deflection device handling the high-voltage portion of the TV 2 for adjustment to each of the first and second reproduction circuits according to the difference of the number of scanning lines.

However, when the VTR 1 is in the Playback mode by which the recorded video signal is reproduced from a recording medium 6 loaded in the VTR 1, this system may encounter with a difficulty in detecting the type of the reproduced video signal, for example, in a transition period immediately after the start of playback during which the reproduction signal is not yet stabilized or in a disabled period during which no record signal is reproduced.

If the system excessively or unnecessarily responds to the judgement result of type of the output video signal, the TV 2 will be forced to change the input signal so frequently that reliability of the TV 2 is deteriorated. The video signal record/reproduction apparatus in accordance with the present invention, therefore, includes an improvement of solving such problems.

Figure 1:
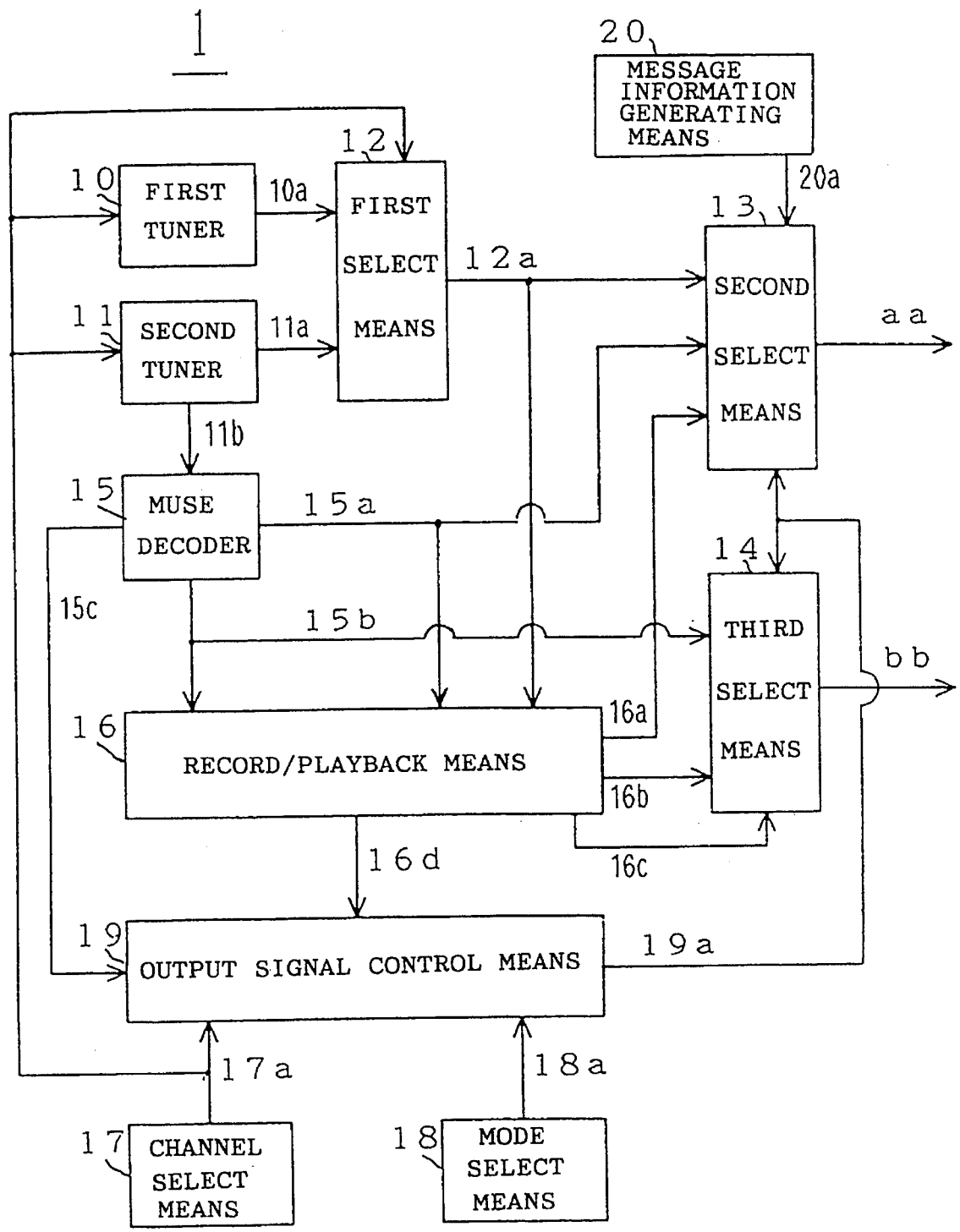
FIG. 1 is a block diagram showing an essential part of a video signal record/reproduction apparatus in accordance with one embodiment of the present invention.

FIG. 1 is a block diagram showing an essential part of the video signal record/reproduction apparatus in accordance with one embodiment of the present invention. In FIG. 1, a reference numeral 10 represents a first tuner which is connected to the first television antenna 3 and receives the NTSC signal (terrestrial broadcast video signal). A reference numeral 11 represents a second tuner which is connected to the second television antenna 4 and receives the HD video signal (satellite broadcast video signal). A reference numeral 12 represents a first select means which selects either one of output signals from the first and second tuners 10 and 11. A reference numeral 15 represents a MUSE decoder which receives a signal detected by the second tuner 11 and makes a judgement of whether the detected signal relates to a MUSE signal. A reference numeral 16 represents a record/playback means which executes record/reproduction of a video signal on/from the recording medium 6 (shown in FIG. 5). A reference numeral 13 represents a second select means which is connected to the first select means 12, the MUSE decoder 15 and the record/playback means 16 and generates the output NTSC signal aa. A reference numeral 14 represents a third select means which is connected to the MUSE decoder 15 and the record/playback means 16 and generates the output HD video signal bb. A reference numeral 17 represents a channel select means which has a function of selecting a desirable channel. A reference numeral 18 represents a mode select means which has a function of selecting a desirable mode. A reference numeral 19 represents an output signal control means which receives signals from the MUSE decoder 15, the record/playback means 16, the channel select means 17 and the mode select means 18 and sends out a control signal to both the second select means 13 and the third select means 14. A reference numeral 20 represents a message information generating means which generates various messages displayed on the TV 2.

For fundamental operations, the VTR 1 has three modes of operation, including E—E mode, Record mode and Playback mode. The E—E mode is designated to select a desirable output video signal from the tuners of the VTR 1 and transmit the selected video signal to the TV 2 without executing record/reproduction operations. The Record mode is designated to select a desirable video signal from the tuners of the VTR 1 and record the selected video signal on the recording medium 6 such as a magnetic tape. The playback mode is designated to reproduce the recorded video signal from the recording medium 6 and transmit this reproduced video signal to the TV 2. The mode select means 18 selects a desirable mode among these three operation modes, and supplies the output signal control means 19 with a mode information signal 18a which is representative of result of mode selection by the mode select means 18. Hereinafter, each of these operation modes will be independently explained in more detail.

E—E Mode

The channel select means 17, when it has selected a desirable channel, sends a channel information signal 17a, which is representative of the selected channel, to each of the first and second tuners 10, 11, the first select means 12 and the output signal control means 19. The first and second tuners 10, 11 respectively select a tuning frequency on the basis of the channel information signal 17a. The first tuner 10 demodulates the terrestrial broadcast video signal received through the first television antenna 3 and outputs a first demodulated video signal 10a to the first select means 12. The second tuner 11 demodulates the satellite broadcast video signal received through the second television antenna 4 and outputs a second demodulated video signal 11a to the first select means 12. The first select means 12 selects either the first demodulated video signal 10a or the second demodulated video signal 11a based on the channel information signal 17a and outputs a first NTSC signal 12a to the second select means 13. The tuner 11, used for satellite broadcast, supplies a detected signal 11b to the MUSE decoder 15. The MUSE decoder 15 makes a judgement of whether the detected signal 11b relates to the MUSE signal. A judgement result of the MUSE decoder 15 is sent out as a judging signal 15c to the output signal control means 19. When it is judged that the detected signal relates to the MUSE signal, the detected signal is decoded by the MUSE decoder 15 to generate a first HD signal 15b which is sent to the third select means 14. The MUSE decoder further generates a second NTSC signal 15a which is a downconverted signal of the first HD signal 15b as a result of deletion of some of scanning lines from the first HD signal 15b. This second NTSC signal 15a is supplied to the second select means 13.

The output signal control means 19 generates a control signal 19a supplied to the second and third select means 13, 14. When the channel information signal 17a relates to the second tuner 11 and the judging signal 15c indicates reception of the MUSE signal (i.e. reception of the HD signal), the output signal control means 19 outputs a control signal 19a to the second and third select means 13, 14 to make the second select means 13 select and send out the second NTSC signal 15a as output NTSC signal aa and at the same time make the third select means 14 select and send out the first HD signal 15b as output HD signal bb. Meanwhile, in other condition (i.e. in the case of reception of NTSC signal), the output signal control means 19 outputs a control signal 19a to the second and third select means 13, 14 to make the second select means 13 select and send out the first NTSC signal 12a as output NTSC signal aa and at the same time make the third select means 14 mute the output HD signal bb.

The muting operation of the output HD signal bb in the NTSC signal reception mode is aimed to prevent the TV 2 from mistakenly detecting the output HD signal bb and forcibly selecting the input signal from the second reproduction circuit, thereby assuring the reception of NTSC signal by the TV 2 and letting the TV 2 display the NTSC signal on its screen.

Record Mode

In the Record mode of the VTR 1, the record/playback means 16 receives the first and second NTSC signals 12a, 15a and the first HD signal 15b, then selects one of these signals on the basis of the mode information signal 18a supplied from the mode select means 18 and the channel information signal 17a supplied from the channel select means 17, and records the selected signal on the recording medium 6.

In this Record mode, the output signal control means 19 generates a control signal 19a supplied to the second and third select means 13, 14 in the following manner.

When the mode information signal 18a and the channel information signal 17a indicate a recording operation of the first 12a or second NTSC signal 15a, the output signal control means 19 outputs a control signal 19a to the second and third select means 13, 14 to make the second select means 13 select and send out the first 12a or second NTSC signal 15a as output NTSC signal aa in accordance with NTSC reception or HD reception and at the same time to make the third select means 14 mute the output HD signal bb.

Meanwhile, when the mode information signal 18a and the channel information signal 17a indicate a recording operation of the first HD signal 15b in the NTSC signal reception mode, the output signal control means 19 outputs a control signal 19a to the second and third select means 13, 14 to make the second select means 13 mute the output NTSC signal aa and at the same time make the third select means 14 select and send out an HD sync signal 16c generated from the record/playback means 16 as output HD signal bb.

Sending out of the HD sync signal 16c is intended to allow the TV 2 to display a black screen to notify the operator of mistake of channel selection.

On the other hand, when the mode information signal 18a and the channel information signal 17a indicate a recording operation of the first HD signal 15b in the HD signal reception mode, the output signal control means 19 outputs a control signal 19a to the second and third select means 13, 14 to make the second select means 13 mute the output NTSC signal aa and at the same time make the third select means 14 select and send out the first HD signal 15b supplied from the MUSE decoder 15 as output HD signal bb.

Instead of muting the output NTSC signal aa, it will be possible to make the second select means 13 select a message information signal 20a supplied from the message information generating means 20 and send out this message information signal 20a as output NTSC signal aa. This message information generating means 20, constituted by a ROM, a sync signal generator and others, generates the message information signal 20a in conformity with the NTSC signal. This message information signal 20a represents a message expressing that the present mode is the recording mode of HD signal; therefore, a set of message characters such as "HD signal recording is going on now. Please select HD signal." is displayed on the screen of the TV 2. Thus the operator can grasp the situation and correctly select the input signal without confusion.

Playback Mode

In the Playback mode, the record/playback means 16 sends a third NTSC signal 16a, which is an NTSC signal reproduced from the recording medium 6 by the record/playback means 16, to the second select means 13 and also sends a second HD signal 16b, which is an HD signal reproduced from the recording medium 6 by the record/playback means 16, to the third select means 14. The record/playback means 16 further supplies the output signal control means 19 with a playback judgement signal 16d which indicates the type of a video signal reproduced or the disabled period of such a signal judgement.

The output signal control means 19 generates a control signal 19a to be supplied to the second and third select means 13, 14 on the basis of the playback judgement signal 16d in the following manner.

When the record/playback means 16 is reproducing an NTSC signal from the recording medium 6 and the type of the reproduced video signal is detectable, the output signal control means 19 outputs a control signal 19a to the second and third select means 13, 14 to make the second select means 13 select and send out the third NTSC signal 16a as output NTSC signal aa and at the same time make the third select means 14 mute the output HD signal bb. Meanwhile, when the record/playback means 16 is reproducing an HD signal from the recording medium 6 and the type of the reproduced HD signal is detectable, the output signal control means 19 outputs a control signal 19a to the second and third select means 13, 14 to make the second select means 13 mute the output NTSC signal aa and at the same time make the third select means 14 select and send out the second HD signal 16b as output HD signal bb. Instead of muting the output NTSC signal aa, it will be possible to make the second select means 13 select the message information signal 20a supplied from the message information generating means 20 and send out this message information signal 20a as output NTSC signal aa in the same manner as the Recording mode.

On the other hand, when the record/playback means 16 is reproducing no signal from the recording medium 6 and therefore the type of the reproduced video signal is undetectable, the output signal control means 19 outputs a control signal 19a to the second and third select means 13, 14 to hold their previous conditions during such a disabled period of signal detection. By the way, when the second HD signal 16b is being reproduced immediately before encountering with the reproduction of such a non-signal portion, the second HD signal 16b selected and sent out is attached to a sync signal. A sync signal is normally deleted when the HD signal is recorded, thus recording the picture portion only. But, a new sync signal is added to the HD signal during the later reproduction operation. In such a case, it is possible to use the sync signal 16c as a detecting signal of disabled condition of signal judgement.

Furthermore, the type of reproduced video signal is difficult to detect in a transition period such as immediately after the operation mode is switched from the E—E mode to the Playback mode, because the reproduced video signal is not yet stabilized in such a transition period. Hence, the output signal control means 19 outputs a control signal 19a to the second and third select means 13, 14 to hold their previous conditions during such a transition period.

Figure 3:
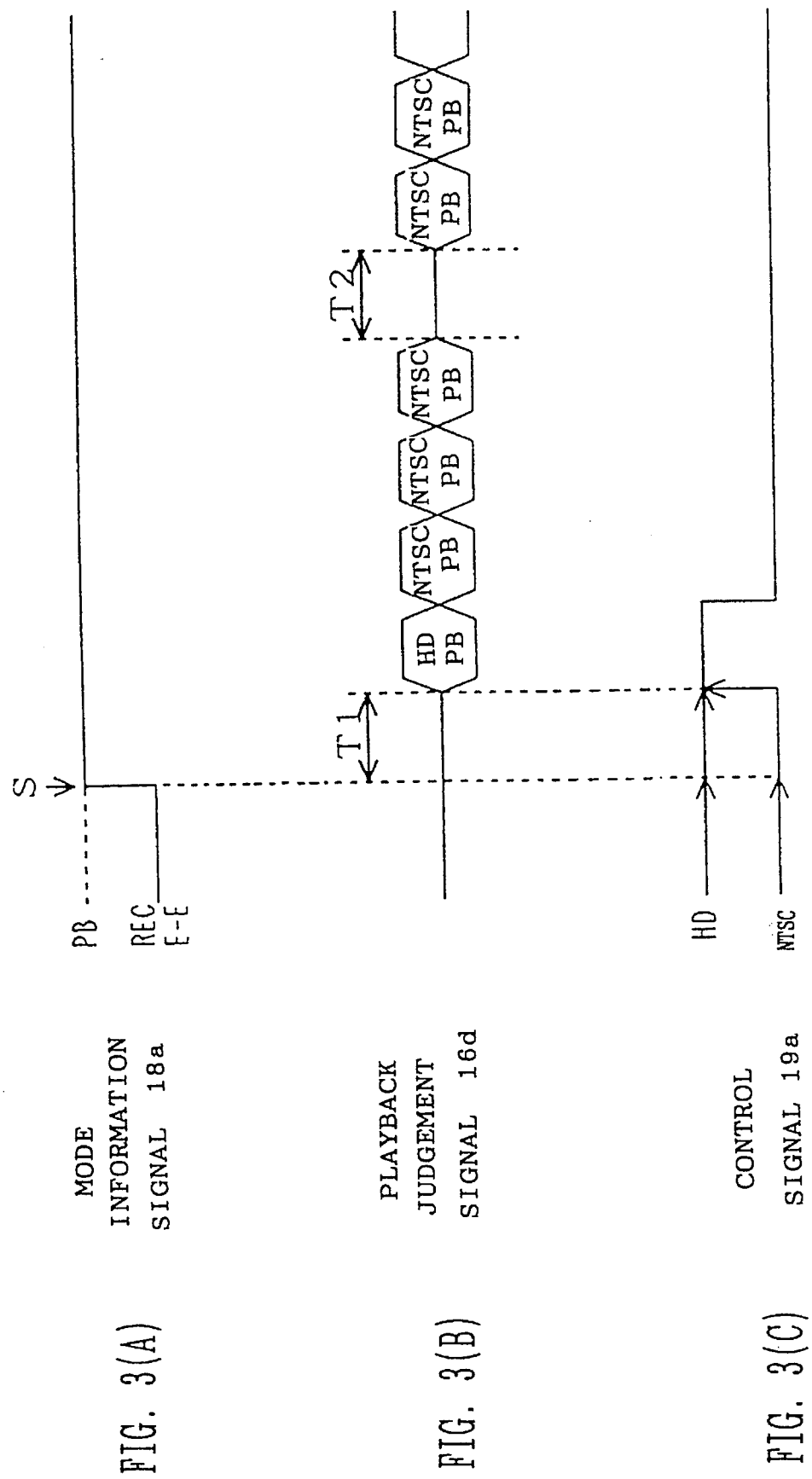
FIG. 3(A) to 3(C) are timing charts illustrating change of signals relating to the Playback mode.
Figure 4:
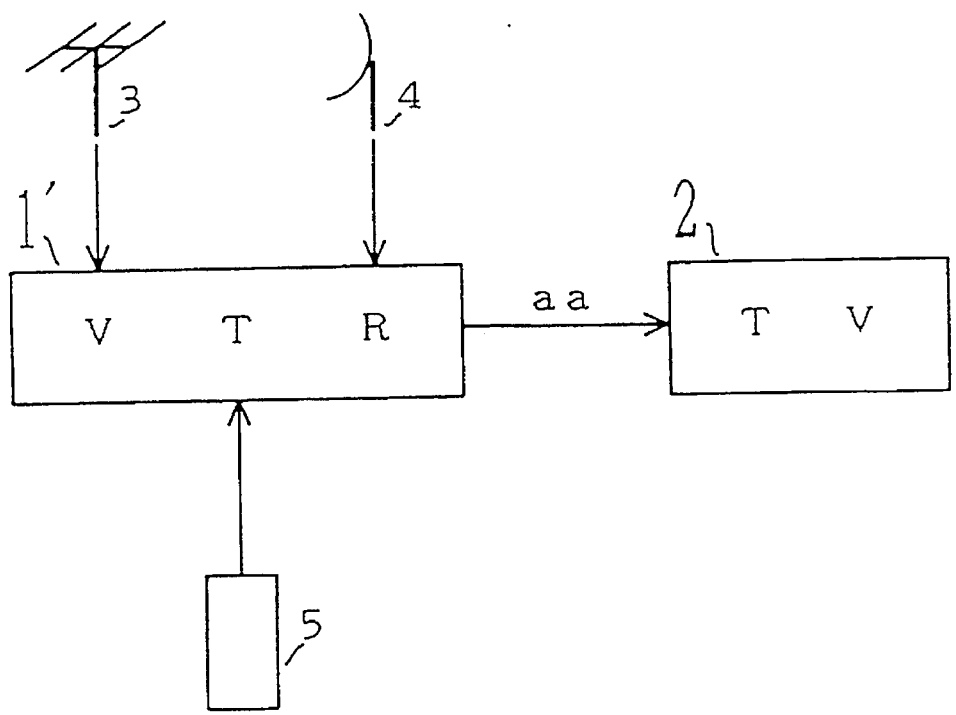
FIG. 4 is a block diagram showing a conventional video signal record/reproduction apparatus with an associated television receiver.

FIG. 2 summarizes the result of output NTSC signal aa (i.e. NTSC OUT) and the output HD signal bb (i.e. HD OUT) in various operating modes explained in the forgoing description. Using the time charts of FIGS. 3(A) to 3(C), switching operation of modes will be explained hereinafter. FIG. 3(A) simply shows the mode information signal 18a, wherein the low level represents the E—E mode or the Record mode while the high level represents the Playback mode. At the time S, the operation mode is switched from the E—E or Record mode to the Playback mode. FIG. 3(B) shows the playback judgement signal 16d. As understood from FIG. 3(B), there is a transition period T1 immediately after the operation mode is switched from the E—E or Record mode to the Playback mode. In such a transition period T1, the reproduction video signal is not yet stabilized and, therefore, the control signal 19a holds the previous condition as shown in FIG. 3(C). If the reproduced video signal is shortly stabilized so that the type of the video signal can be detected, the playback judgement signal 16d changes to a detectable signal (i.e. HD PB) indicating the playback of HD signal as shown in FIG. 3(B). Based on this playback judgement signal 16d, the output signal control means 19 controls the second and third select means 13, 14 to select and send out the output video signals identified by "HD Playback" mode of "Rec-signal playback" in the table of FIG. 2. According to the example of FIG. 3(B), the playback judgment signal 16d is subsequently switched to an "NTSC PB" signal. Hence, the output signal control means 19 controls the second and third select means 13, 14 to select and send out the output video signals identified by "NTSC Playback" mode of "Rec-signal playback" in the table of FIG. 2.

If there is a disabled period T2 during which the type of the reproduced video signal is not detectable, the playback judgement signal 16d cannot be detected in this disabled period T2 as shown in FIG. 3(B). In such a disabled period T2, the control signal 19a holds the previous condition as shown in FIG. 3(C). Thus, the output signal control means 19 continues to make the second and third select means 13, 14 select and send out the output video signals identified by "NTSC Playback" mode of "Rec-signal playback" in the table of FIG. 2.

Although the above-described embodiment is based on the video signal record/reproduction apparatus, it is needless to say that the present invention can be applied to a video signal reproduction apparatus having reproduction function only.

Although the above-described embodiment explains the VTR as the video signal reproduction or record/reproduction apparatus, the present invention is not limited to the VTR. Therefore, the video signal reproduction or record/reproduction apparatus can be, for example, an electronic camera using a disk-like recording medium, or a magneto-optical reproduction or record/reproduction apparatus, or optical reproduction or record/reproduction apparatus utilizing phase change.

In accordance with the present invention, the video signal reproduction or record/reproduction apparatus comprises the first playback means for generating an NTSC signal reproduced from the record medium, the second playback means for generating an HD signal reproduced from the recording medium, the judging means for judging the type of a reproduced video signal, and the output signal control means for controlling the first and second playback means in such a manner that, when judging result of the judging means indicates that the type of reproduced video signal is an NTSC signal, the output signal control means makes the first playback means send out the NTSC signal and make the second playback means mute the HD signal. Thus, it becomes possible to surely display a desired video signal on the TV screen by automatically switching the input signal between the first and second playback means based on the detection of the presence of HD signal.

Furthermore, in a disabled period during which the judging means cannot judge the type of the reproduced video signal, the output signal control means controls the first and second playback means so as to cooperatively select either the NTSC signal or the HD signal on the basis of a judging result judged by the judging means immediately before such a disabled period. Thus, it becomes possible to avoid unnecessary switching of input signal and accordingly enhance reliability of the system.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A video signal reproduction or record/reproduction apparatus comprising:

first playback means for reproducing a normal video signal from a recording medium and outputting a reproduced normal video signal; second playback means for reproducing a high definition video signal from the recording medium and outputting a reproduced high definition video signal;

first output means associated with said first playback means for selectively transmitting the reproduced normal video signal;

second output means associated with said second playback means for selectively muting the reproduced high definition video signal;

judging means for judging a type of a reproduced video signal;

output signal control means responsive to the type of the reproduced video signal judged by said judging means for controlling said first output means and said second output means in such a manner that, when a judgement result of said judging means indicates that the type of the reproduced video signal is a normal video signal, said output signal control means allows said first output means to transmit the reproduced normal video signal and makes said second output means mute the reproduced high definition video signal, wherein, in a disabled or transition period during which said judging means cannot judge the type of the reproduced video signal, said output signal control means controls said first output means and said second output means to select an output video signal on the basis of a judgement result of said judging means judged immediately before such a disabled or transition period.

2. A video signal reproduction or record/reproduction apparatus as recited in claim 1, further comprising separate signal paths for the reproduced signals respectively outputted by said first and second output means.

3. A video signal reproduction or record/reproduction apparatus comprising:

first playback means for reproducing a normal video signal from a recording medium and outputting a reproduced normal video signal; second playback means for reproducing a high definition video signal from the recording medium and outputting a reproduced high definition video signal;

first output means associated with said first playback means for selectively muting the reproduced normal video signal;

second output means associated with said second playback means for selectively transmitting the reproduced high definition video signal;

judging means for judging a type of a reproduced video signal;

output signal control means responsive to the type of the reproduced video signal judged by said judging means for controlling said first output means and said second output means in such a manner that, when a judgement result of said judging means indicates that the type of the reproduced video signal is a high definition video signal, said output signal control means makes said first output means mute the reproduced normal video signal and allows said second output means to transmit the reproduced high definition video signal, wherein, in a disabled or transition period during which said judging means cannot judge the type of the reproduced video signal, said output signal control means controls said first output means and said second output means to select an output video signal on the basis of a judgement result of said judging means judged immediately before such a disabled or transition period.

4. A video signal reproduction or record/reproduction apparatus comprising:

first playback means for reproducing a normal video signal from a recording medium and outputting a reproduced normal video signal; second playback means for reproducing a high definition video signal from said recording medium and outputting a reproduced high definition video signal;

first output means associated with said first playback means for selectively sending out a message;

second output means associated with said second playback means for selectively transmitting the reproduced high definition video signal;

judging means for judging a type of a reproduced video signal;

output signal control means responsive to said judging means for controlling said first output means and said second output means on the basis of the type of the reproduced video signal judged by said judging means in such a manner that, when a judgement result of said judging means indicates that the type of the reproduced video signal is a high definition video signal, said output signal control means makes said first output means send out the message for informing an operator of a present playback mode and allows said second output means to transmit the reproduced high definition video signal, wherein, in a disabled or transition period during which said judging means cannot judge the type of the reproduced video signal, said output signal control means controls said first output means and said second output means to select an output video signal on the basis of a judgement result of said judging means judged immediately before such a disabled or transition period.

5. A video signal recording and reproducing apparatus comprising:

first demodulating means for demodulating a normal video signal received through a first television antenna and outputting a demodulated normal video signal;

second demodulating means for demodulating a high definition video signal received through a second television antenna and outputting a demodulated high definition video signal;

recording and playback means for recording said normal video signal or said high definition video signal on a recording medium and reproducing a reproduced normal video signal or a reproduced high definition video signal from the recording medium;

judging means for judging a type of a demodulated video signal in a recording mode and judging a type of a reproduced video signal in a reproducing mode;

first output means for transmitting the demodulated normal video signal or the reproduced normal video signal or muting the normal video signal;

second output means for transmitting the demodulated high definition video signal or the reproduced high definition video signal or muting the high definition video signal;

output signal control means responsive to said judging means for controlling said first output means and said second output means in such a manner that, (i) in the recording mode, when a judgement result of said judging means indicates that the type of the demodulated video signal is the normal video signal, said output signal control means allows said first output means to transmit the demodulated normal video signal and makes said second output means mute the high definition video signal, (ii) in said recording mode, when the judgement result of said judging means indicates that the type of the demodulated video signal is the high definition video signal, said output signal control means makes said first output means mute the normal video signal and allows said second output means to transmit the demodulated high definition video signal, (iii) in the reproducing mode, when the judgement result of said judging means indicates that the type of the reproduced video signal is the normal video signal, said output signal control means allows said first output means to transmit the reproduced normal video signal and makes said second output means mute the high definition video signal, and (iv) in said reproducing mode, when the judgement result of said judging means indicates that the type of the reproduced video signal is the high definition video signal, said output signal control means makes said first output means mute the normal video signal and allows said second output means to transmit the reproduced high definition video signal, wherein, in a disabled or transition period during which said judging means cannot judge the type of the demodulated or reproduced video signal, said output signal control means controls said first output means and said second output means to select an output video signal on the basis of a judgement result of said judging means judged immediately before such a disabled or transition period.

* * * * *